US012188260B2

(12) United States Patent
Yang

(10) Patent No.: US 12,188,260 B2
(45) Date of Patent: Jan. 7, 2025

(54) LOCK DEVICE WITH DOUBLE-UNLOCKING MODE

(71) Applicant: Yao-Kun Yang, Taichung (TW)

(72) Inventor: Yao-Kun Yang, Taichung (TW)

( * ) Notice: Subject to any disclaimer, the term of this patent is extended or adjusted under 35 U.S.C. 154(b) by 77 days.

(21) Appl. No.: 18/197,737

(22) Filed: May 16, 2023

(65) Prior Publication Data

US 2024/0384565 A1 Nov. 21, 2024

(51) Int. Cl.

*E05B 37/02* (2006.01)
*E05B 47/00* (2006.01)
*E05B 19/00* (2006.01)

(52) U.S. Cl.

CPC .......... *E05B 37/02* (2013.01); *E05B 47/0012* (2013.01); *E05B 19/0005* (2013.01); *E05B 2047/0017* (2013.01)

(58) Field of Classification Search

CPC .. E05B 37/02; E05B 47/0012; E05B 19/0005; E05B 2047/0017

See application file for complete search history.

(56) References Cited

U.S. PATENT DOCUMENTS

2010/0223170 A1* 9/2010 Bahar ..................... G07C 9/33 705/325
2011/0220521 A1* 9/2011 Parker .................. A45C 11/328 206/216
2013/0117176 A1* 5/2013 Oler ....................... B65D 50/00 220/212
2017/0234038 A1* 8/2017 Sanford ................ E05B 37/025 70/63
2019/0234113 A1* 8/2019 Neau ..................... E05B 17/002

* cited by examiner

*Primary Examiner* — Christine M Mills
*Assistant Examiner* — Christopher F Callahan

(57) ABSTRACT

The present disclosure provides a lock device with double-unlocking mode comprises a lock box, a lock cover set, a fingerprint unlocking module, and a coded wheel lock set. The lock box has a box and a front cover. The fingerprint unlocking module has a master unit electrically connected with a power, a charging hole, an electric unlocking component, and a fingerprint sensor. The master unit controls the electric unlocking component to lock or to unlock in accordance with sensing results of the fingerprint sensor. When a code of the coded wheel lock set is set correctly, the lock cover set is manually operated to unlock. The fingerprint unlocking module is not used for performing unlocking, the unlocking operation may be manually completed. Indeed, the present disclosure improves the issue that the current electronic lock is not able to be unlocked immediately by normal means in a power failure case.

7 Claims, 17 Drawing Sheets

LOCK DEVICE WITH DOUBLE-UNLOCKING MODE

FIELD OF THE DISCLOSURE

The present disclosure relates to a lock device with double-unlocking mode which includes two types of unlocking mode in a manual unlocking manner and in an electric unlocking manner.

BACKGROUND OF THE DISCLOSURE

Lock device is a necessary product for every family in current society. The lock device has a function of preventing stranger from opening the door and further invading the room, so as to further achieve effects for protecting home property, personal safety, and preventing stranger from invading, or increasing anti-theft capabilities for storage devices where valuables are placed, such as double-lock serving for the safety deposit box, luggage locks, airport locks, spare key lock boxes, etc.

With the advancement of technology, various types of electronic unlocking for the lock device have begun to appear, such as face recognition, fingerprint recognition, etc., so as to quickly open the lock device.

However, the aforementioned electronic lock has a very serious defect. That is, if power of the lock device is neglected so that the electronic lock completely loses power, the electronic lock is not able to be unlocked immediately by normal means. This is a very troublesome matter.

In view of the above, it is known that it is necessary to improve the issue that the electronic lock is not able to be unlocked immediately by normal means in power failure case.

SUMMARY OF THE DISCLOSURE

In order to solve the issue existing in conventional electronic lock devices, the coded wheel lock set for manual locking and manual unlocking and the fingerprint unlocking module for electric unlocking are configured in the present disclosure respectively, and both of the two said unlocking mode are able to complete the unlocking action independently. It means that even though the power is out or failed in the present disclosure, the unlocking operation can be still completed in a manual operation manner after operating the coded wheel lock set immediately. Indeed, the present disclosure improves the issue that the current electronic lock is not able to be unlocked immediately by normal means in a power failure case, therefore the present disclosure is novelty and non-obviousness.

In order to achieve the purpose and effect, the present disclosure provides a lock device with double-unlocking mode comprising: a lock box comprising a box and a front cover, the box is mutually pivoted to the front cover, the box has a receiving space, the box has a lock groove; a lock cover set disposed at the front cover, and the lock cover set comprises an active bolt, when the lock cover set is presented in a locking state, the active bolt is inserted in the lock groove, when the lock cover set is presented in an unlocking state, the active bolt is separated from the lock groove; a fingerprint unlocking module disposed at the front cover, and the fingerprint unlocking module comprises a master unit electrically connected with a power, a charging hole, an electric unlocking component, and a fingerprint sensor, the master unit controls the electric unlocking component to lock, or the master unit controls the electric unlocking component to unlock in accordance with sensing results of the fingerprint sensor; and a coded wheel lock set disposed at the front cover, when a code of the coded wheel lock set is set correctly, the lock cover set is able to be manually operated to unlock.

DETAILED DESCRIPTION OF THE EXEMPLARY EMBODIMENTS

Figure 1:
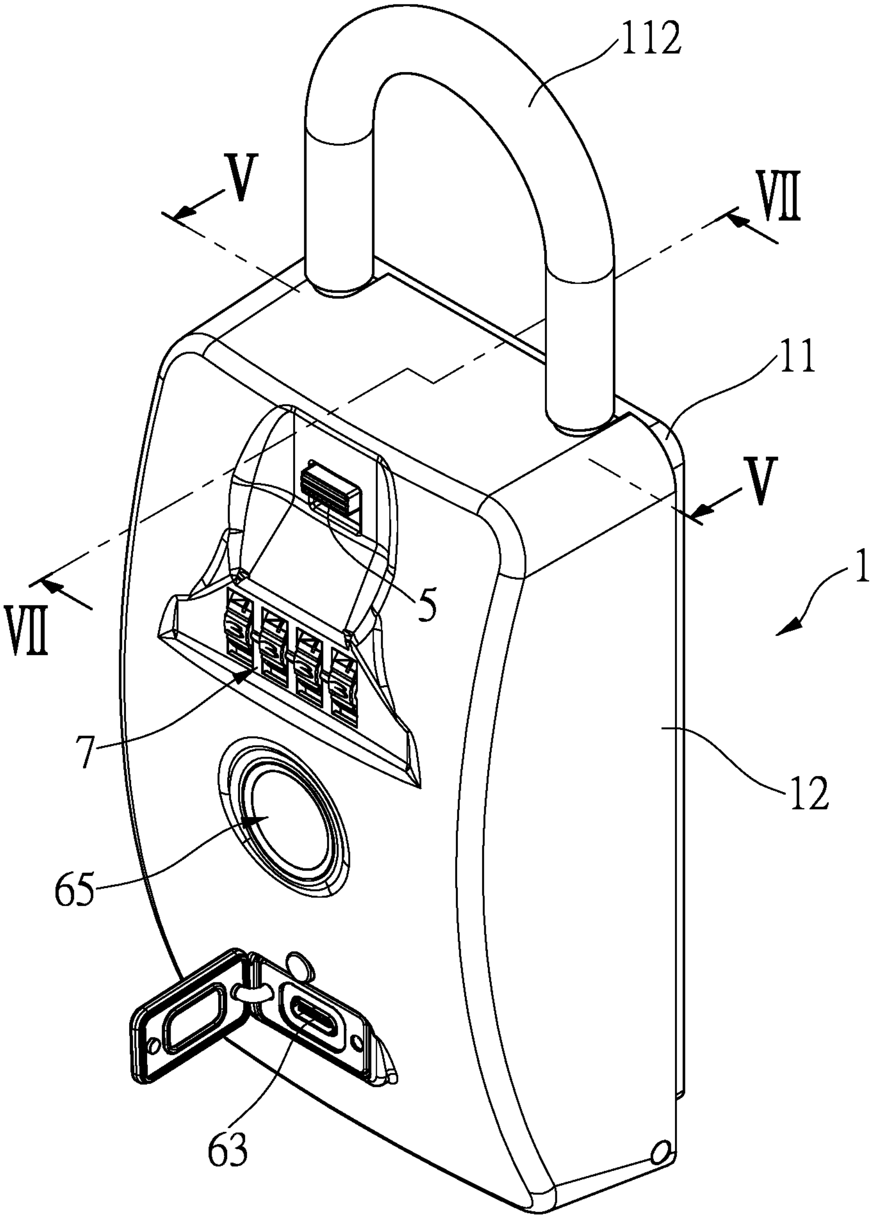
FIG. 1 is a perspective view of the present disclosure.
Figure 1A:
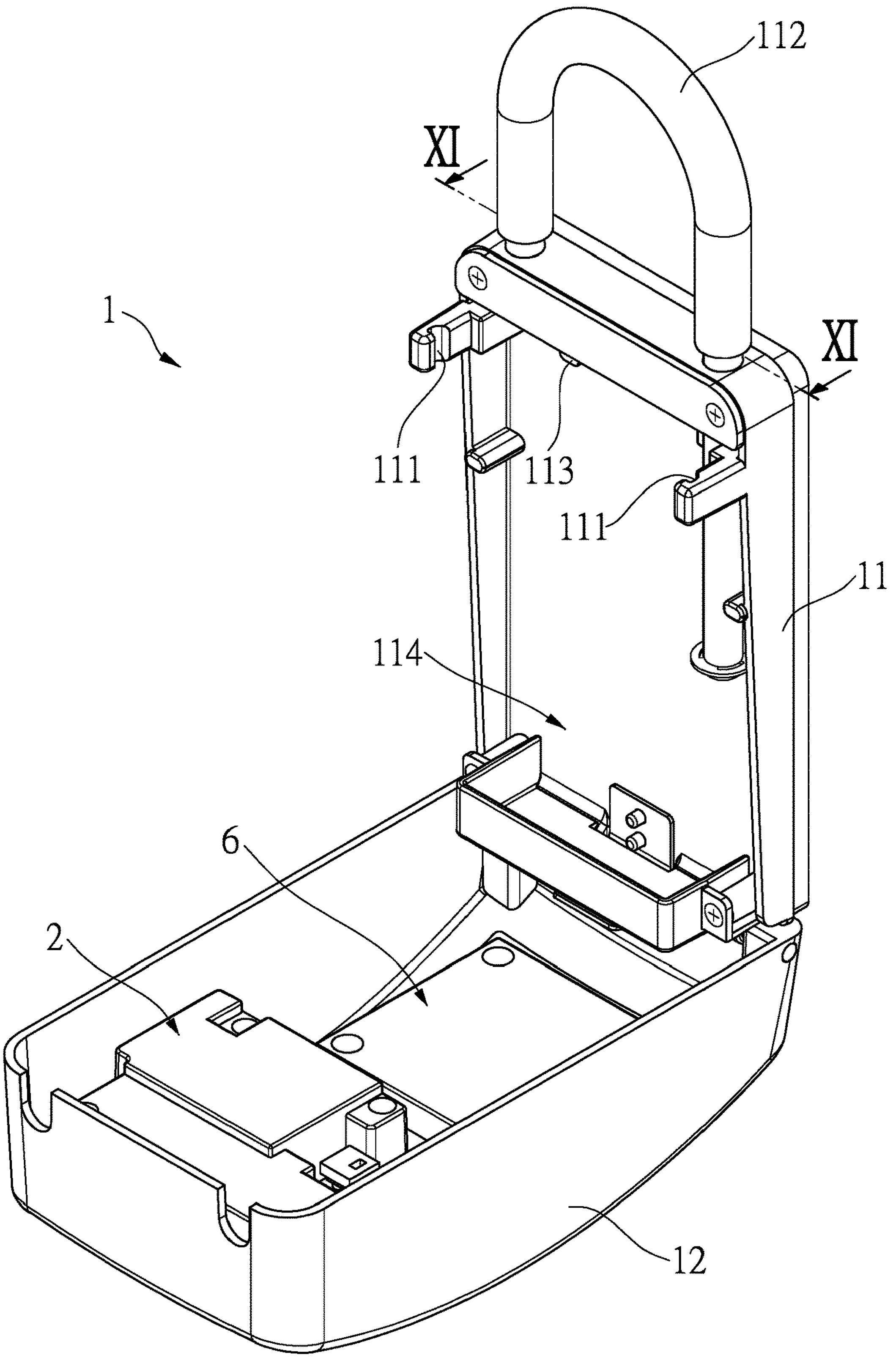
FIG. 1A is a perspective view illustrating a case that the front cover is opened in the present disclosure.

In order to fully understand the implementation of the present disclosure, please refer this specification in conjunction with the accompanying drawings. As shown in FIG. 1 to FIG. 13, the present disclosure is a lock device with double-unlocking mode comprising a lock box 1, a lock cover set 2, a fingerprint unlocking module 6, and a coded wheel lock set 7.

The lock box 1 comprises a box 11 and a front cover 12, the box 11 is mutually pivoted to the front cover 12. The box 11 has a receiving space 114. The box 11 has a lock groove 111.

The lock cover set 2 is disposed at the front cover 12, and the lock cover set 2 comprises an active bolt 21. When the lock cover set 2 is in a locking state, the active bolt 21 is inserted in the lock groove 111. When the lock cover set 2 is in an unlocking state, the active bolt 21 is separated from the lock groove 111.

The fingerprint unlocking module 6 is disposed at the front cover 12, and the fingerprint unlocking module 6 comprises a master unit 61 electrically connected with a power 62, a charging hole 63, an electric unlocking component 64, and a fingerprint sensor 65.

The master unit 61 controls the electric unlocking component 64 to lock, or the master unit 61 controls the electric unlocking component 64 to unlock in accordance with sensing results of the fingerprint sensor 65.

The coded wheel lock set 7 is disposed at the front cover 12. When a code of the coded wheel lock set 7 is set correctly, the lock cover set 2 is able to be manually operated to unlock.

Followed by the content mentioned above, the implementation of the present disclosure is further illustrated in detail. The drawing of the present disclosure is the form with two active bolts 21 as an example, an amount of the elements associated with the active bolts 21 will be two, for example, the lock groove 111 etc.

Figure 3:
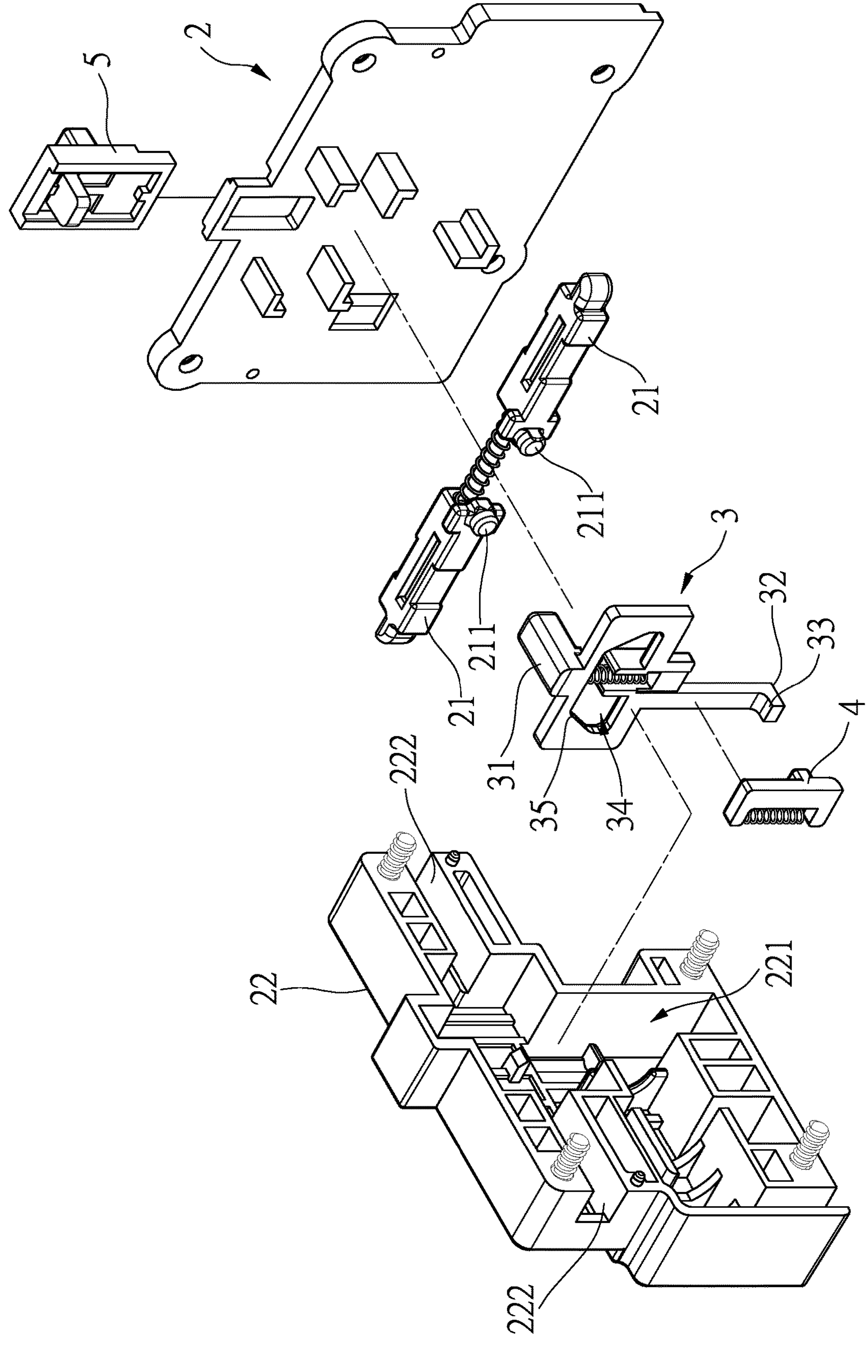
FIG. 3 is an exploded view of the lock cover set.
Figure 3A:
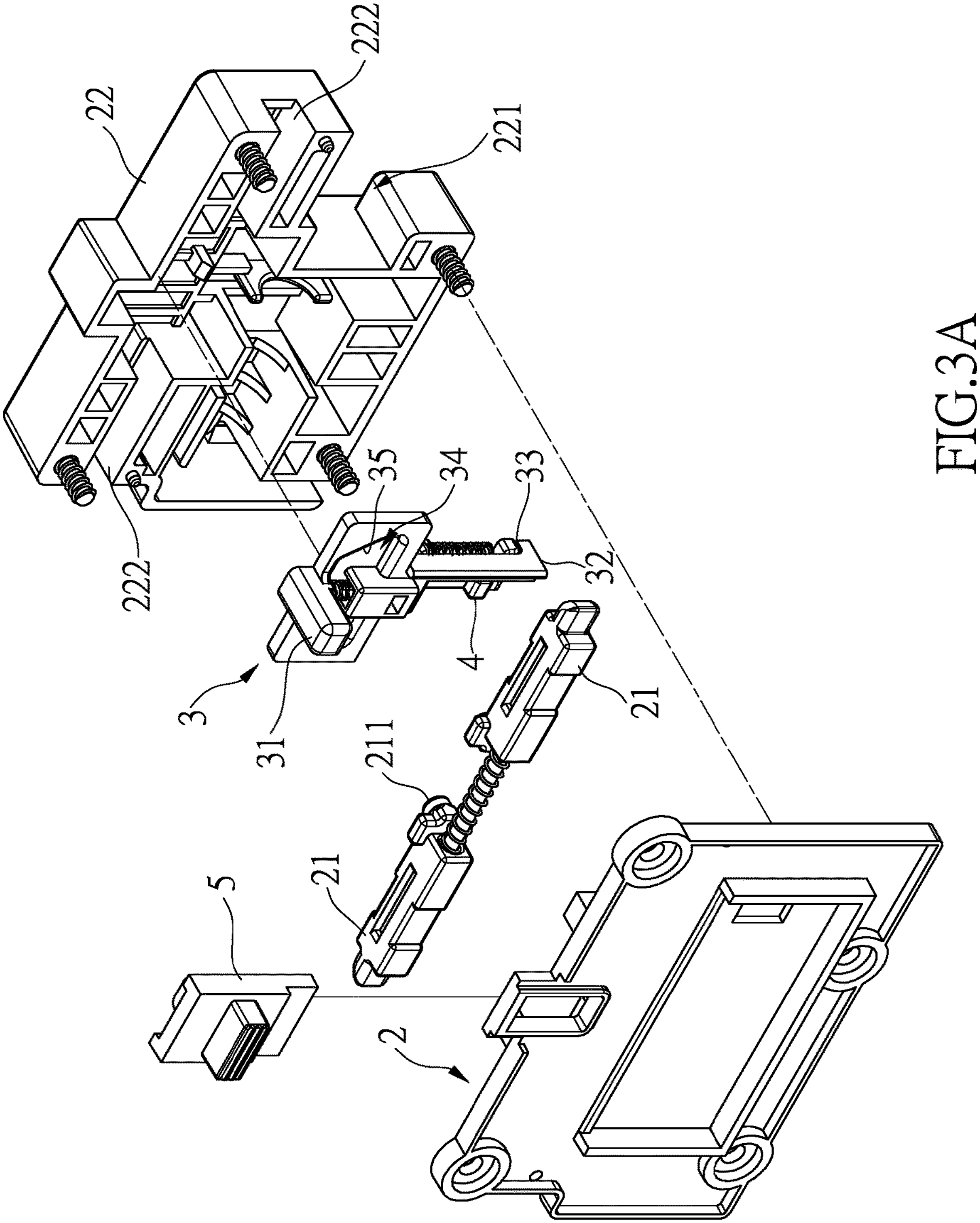
FIG. 3A is an exploded view of the lock cover set at another view angle.
Figure 5:
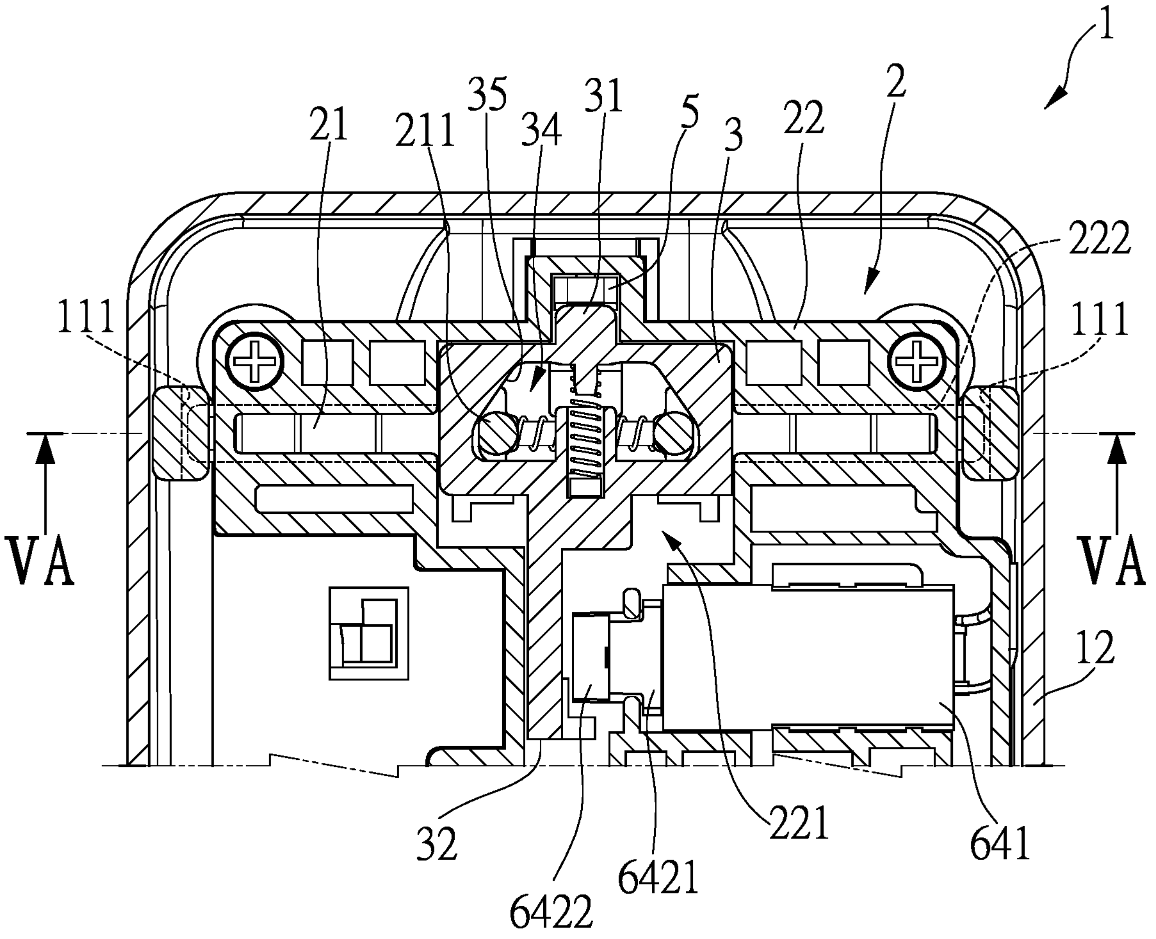
FIG. 5 is a cross-section view along V-V line of FIG. 1.
Figure 5A:
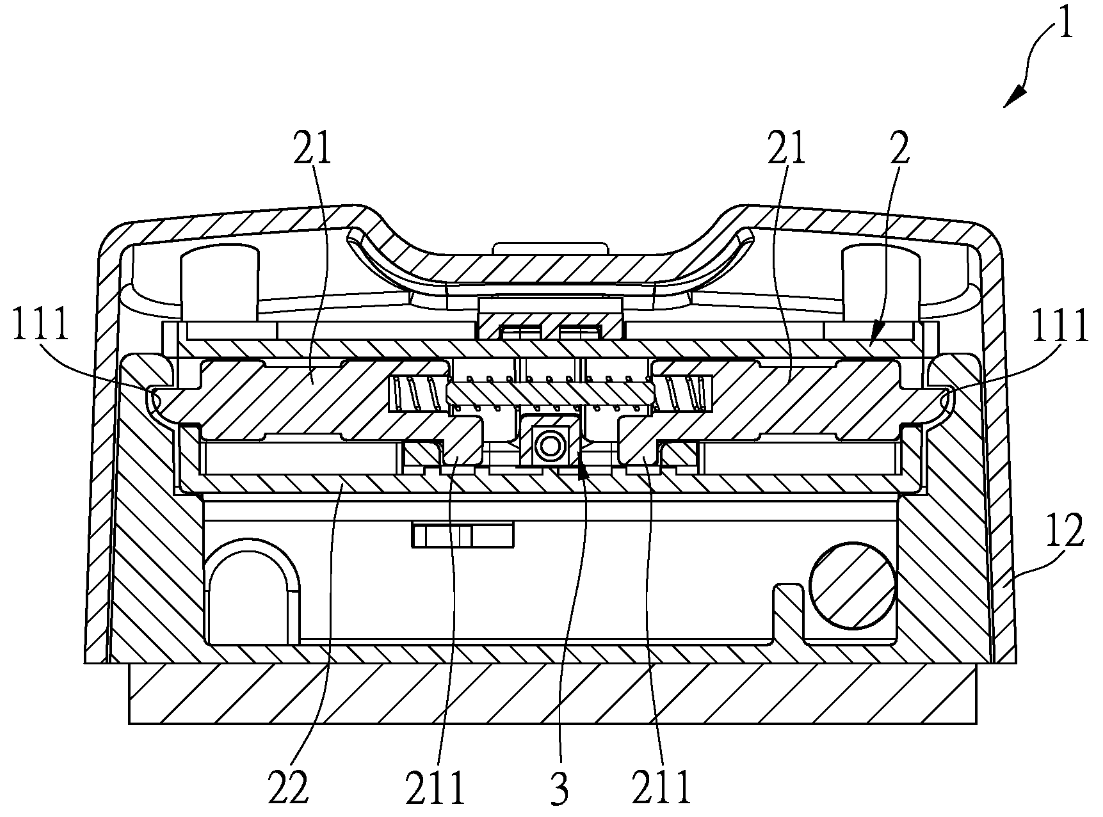
FIG. 5A is a cross-section view along VA-VA line of FIG. 5.

Various embodiments for locking and unlocking associated with the lock cover set 2 of the present disclosure is illustrated in conjunction with the accompanying drawings. As shown in FIG. 3, FIG. 5, and FIG. 5A, first of all the lock cover set 2 further comprises a frame 22 and a linking member 3. The lock cover set 2 is disposed at the front cover 12 by the frame 22. The frame 22 comprises a sliding space 221 and a sliding rail 222 communicated with each other. The linking member 3 is movable in the sliding space 221. The active bolt 21 is slidably disposed in the sliding space 221.

Wherein the linking member 3 has a guiding groove 34 which has a guiding incline wall surface 35. The active bolt 21 comprises a guide projection 211 which is inserted into the guiding groove 34, and the guide projection 211 abuts against the guiding incline wall surface 35. Thus, the guide projection 211 will be guided by the guiding incline wall surface 35 when the linking member 3 shifts, so that the active bolt 21 shifts.

Figure 6:
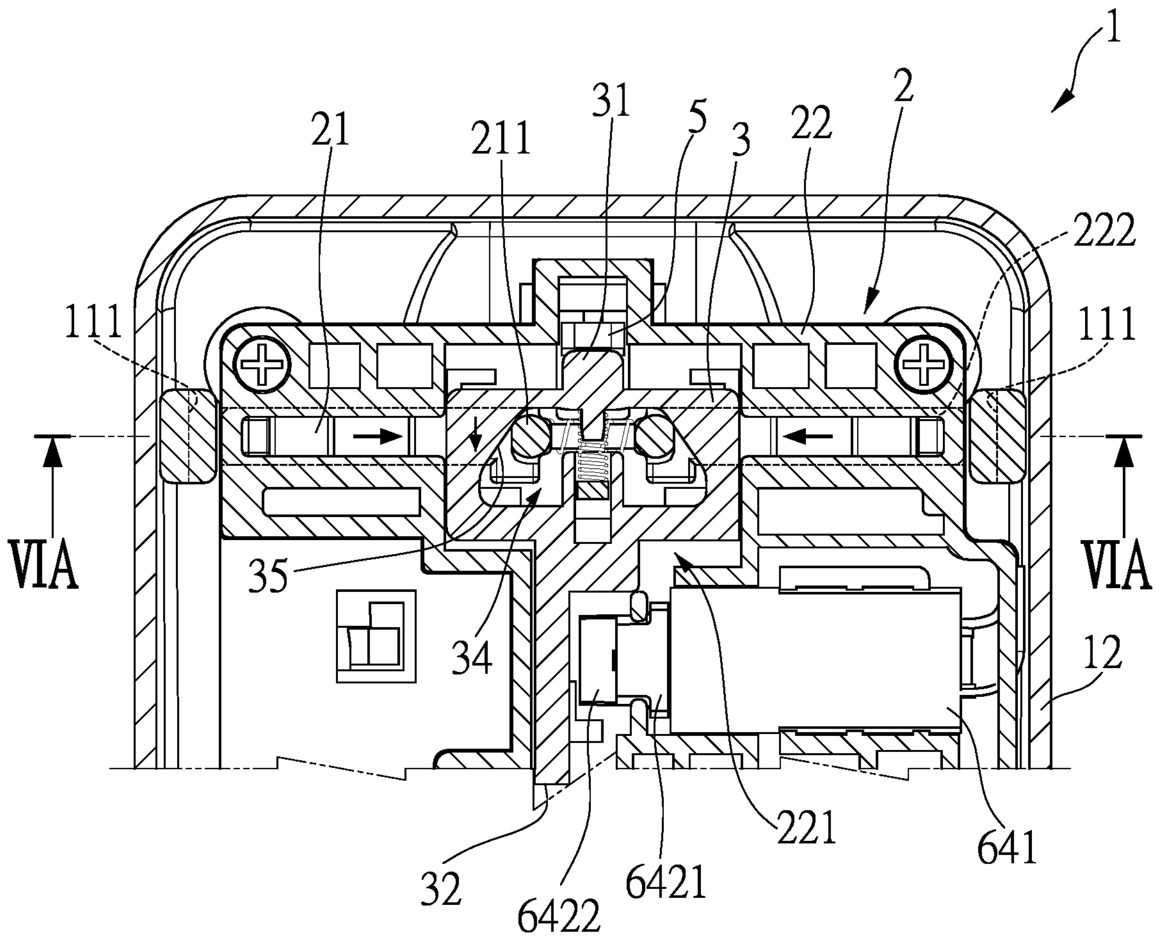
FIG. 6 is a view illustrating that the linking member shifts and the active bolt indents in unlocking case.
Figure 6A:
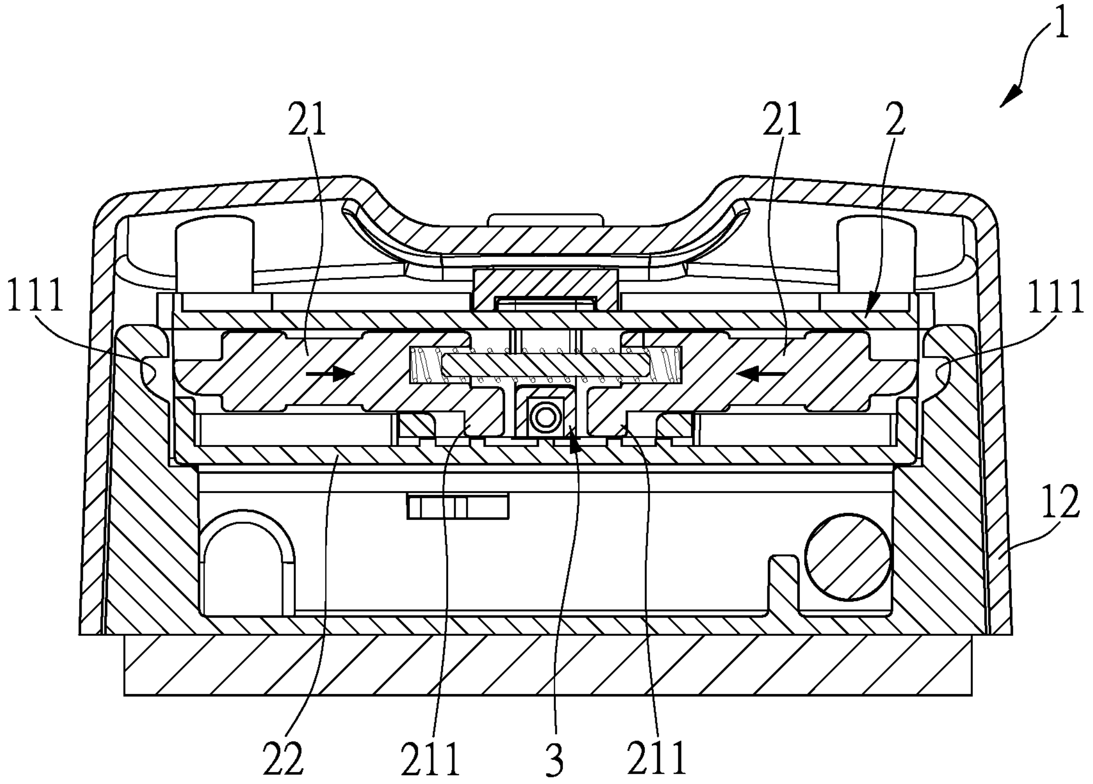
FIG. 6A is a cross-section view along VA-VA line of FIG. 6.

As shown in FIG. 6 and FIG. 6A, for example, the linking member 3 shifts downward so that the active bolt 21 indents and separates from the lock groove 111, therefore an unlocking action is completed. A shift direction when above element shifts is presented by an arrow of each drawing.

Figure 4:
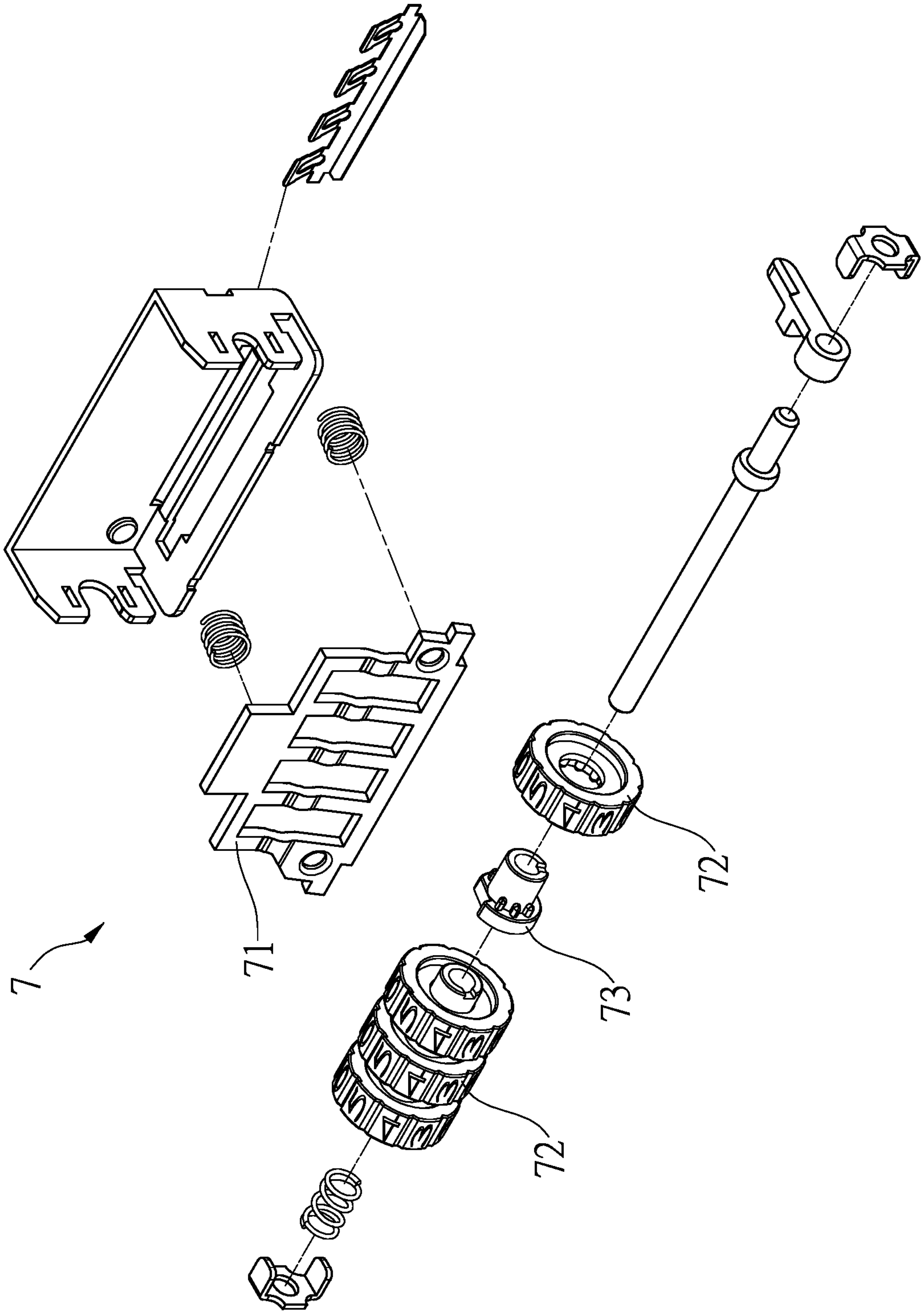
FIG. 4 is an exploded view of the coded wheel lock set.
Figure 7:
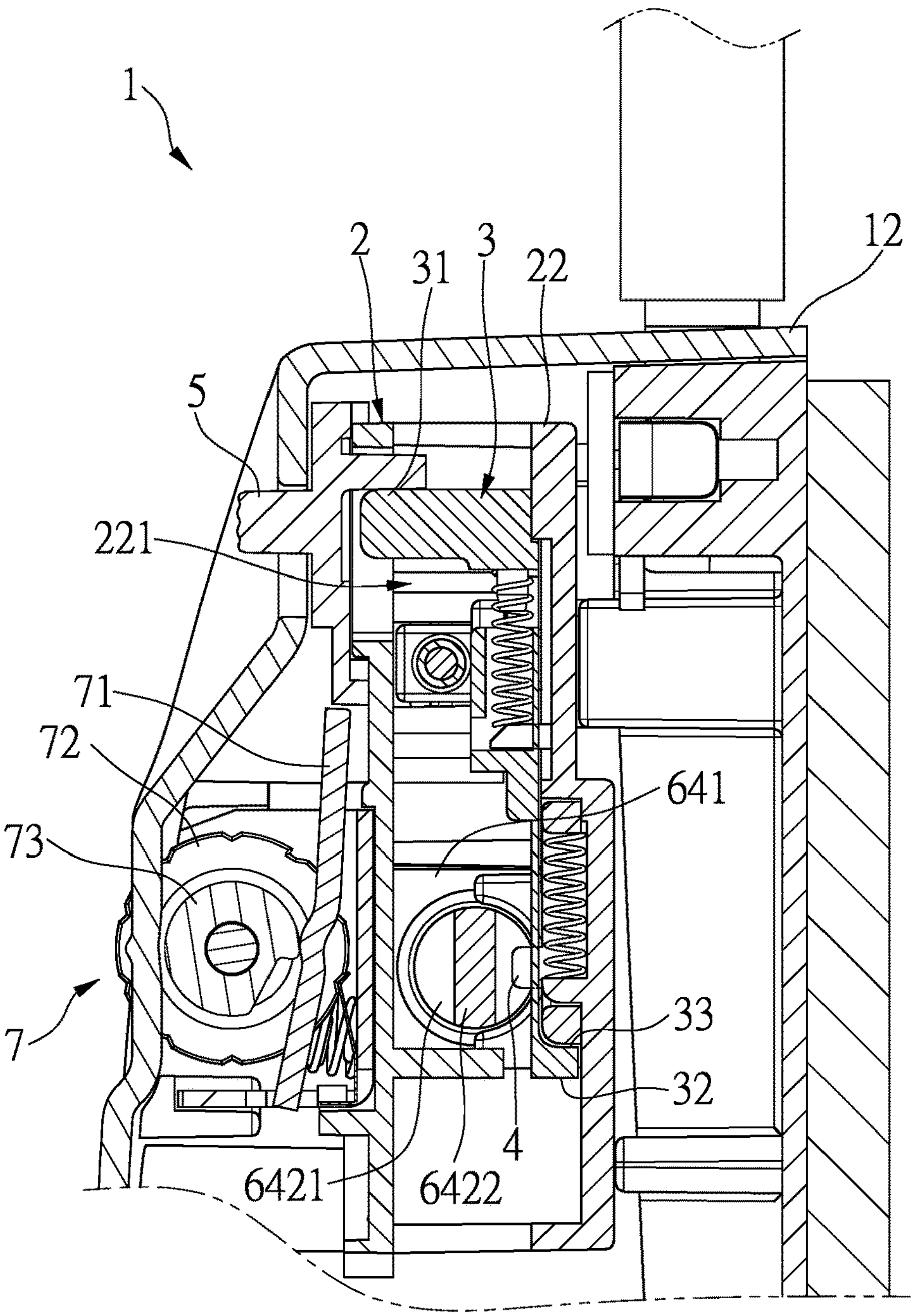
FIG. 7 is a cross-section view along VII-VII line of FIG. 1.

The content that how a user shifts the linking member 3 to achieve an unlocking purpose is further described in detail. As shown in FIG. 3, FIG. 4 and FIG. 7, an implementation of manual unlocking is introduced in first, wherein the lock cover set 2 further comprises a manual unlocking component 5, two opposite ends of the linking member 3 are a manual end 31 and an electric end 32 respectively. The manual unlocking component 5 abuts against manual end 31, the manual unlocking component 5 is partially corresponding to the coded wheel lock set 7.

In the locking state presented as FIG. 7, in this drawing a rotation wheel 72 is located at a position where the code is error, therefore a protrusion portion of an actuation member 73 will abut against a rocker 71, so that a shift path of the manual unlocking component 5 is blocked by the rocker 71. While a sufficient shift amount, which causes the active bolt 21 to separate from the lock groove 111, generated by the linking member 3 is not achieved by operating the manual unlocking component 5.

Figure 8:
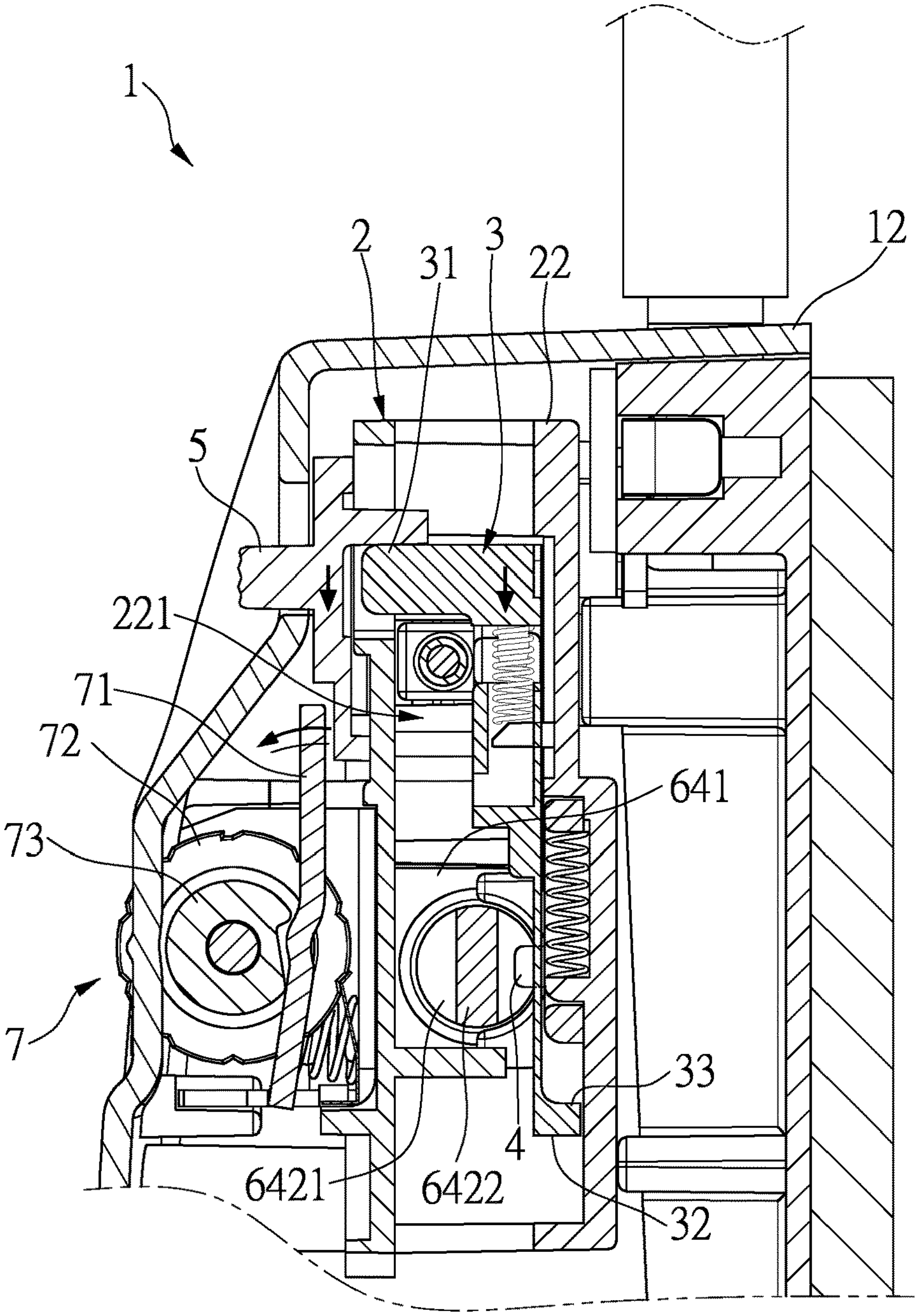
FIG. 8 is a view illustrating that the coded wheel lock set is unlocked and the manual unlocking component is operated to drive the linking member to shift.

When the user operates the rotation wheel 72, as shown in FIG. 8, in the condition that a rotated position is corresponding to a correct code position, the actuation member 73 is driven to rotate (the rotation wheel 72 and the actuation member 73 are engaged with each other) such that a hollow portion is corresponding to the rocker 71. The rocker 71 offsets forward a direction of the rotation wheel 72 instead of blocking the shift path of the manual unlocking component 5. Therefore, shift of the manual unlocking component 5 is able to be operated by the user for driving the linking member 3 to shift, such that the active bolt 21 separates from the lock groove 111.

Figure 2:
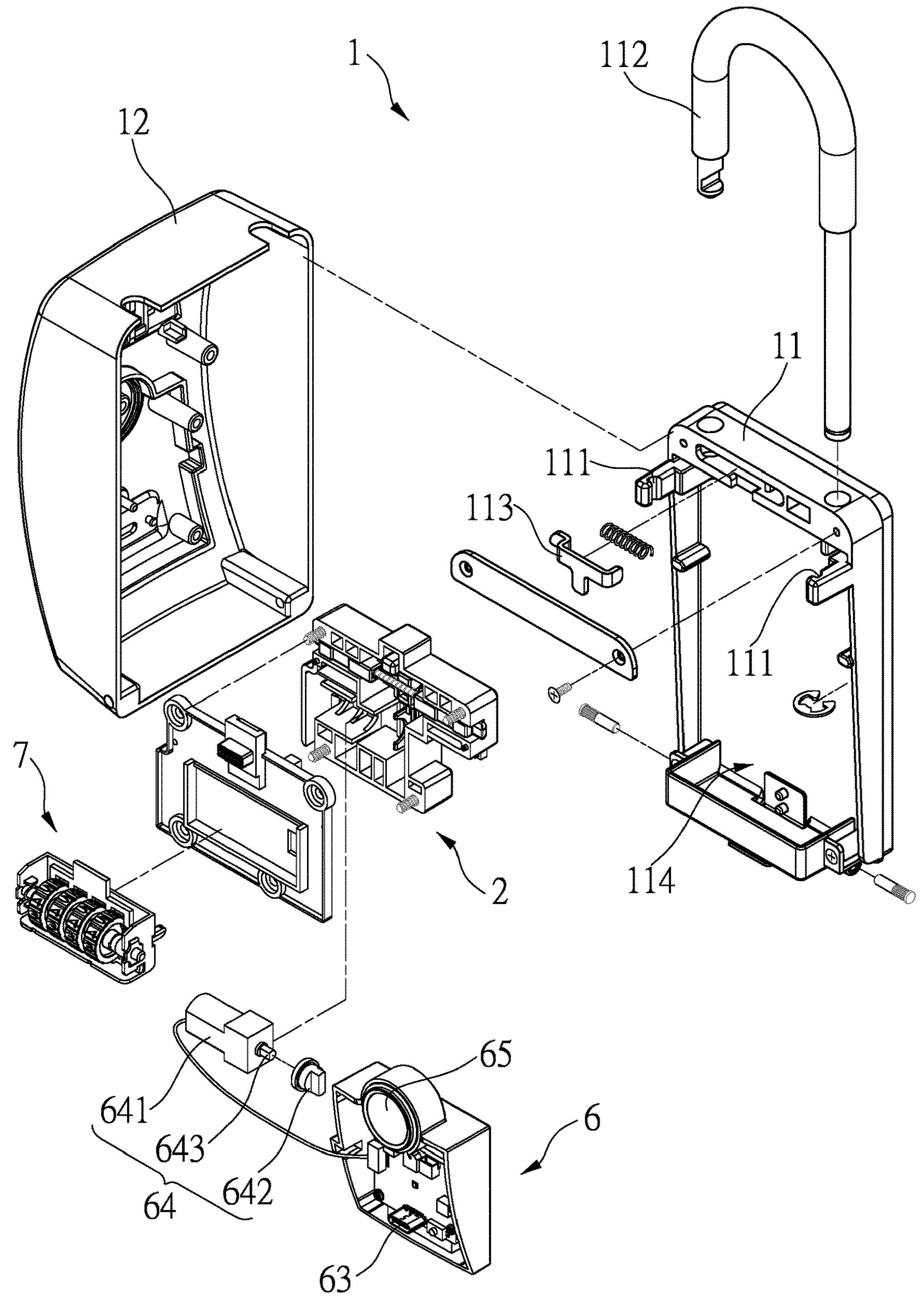
FIG. 2 is a partial exploded view of the present disclosure.
Figure 9:
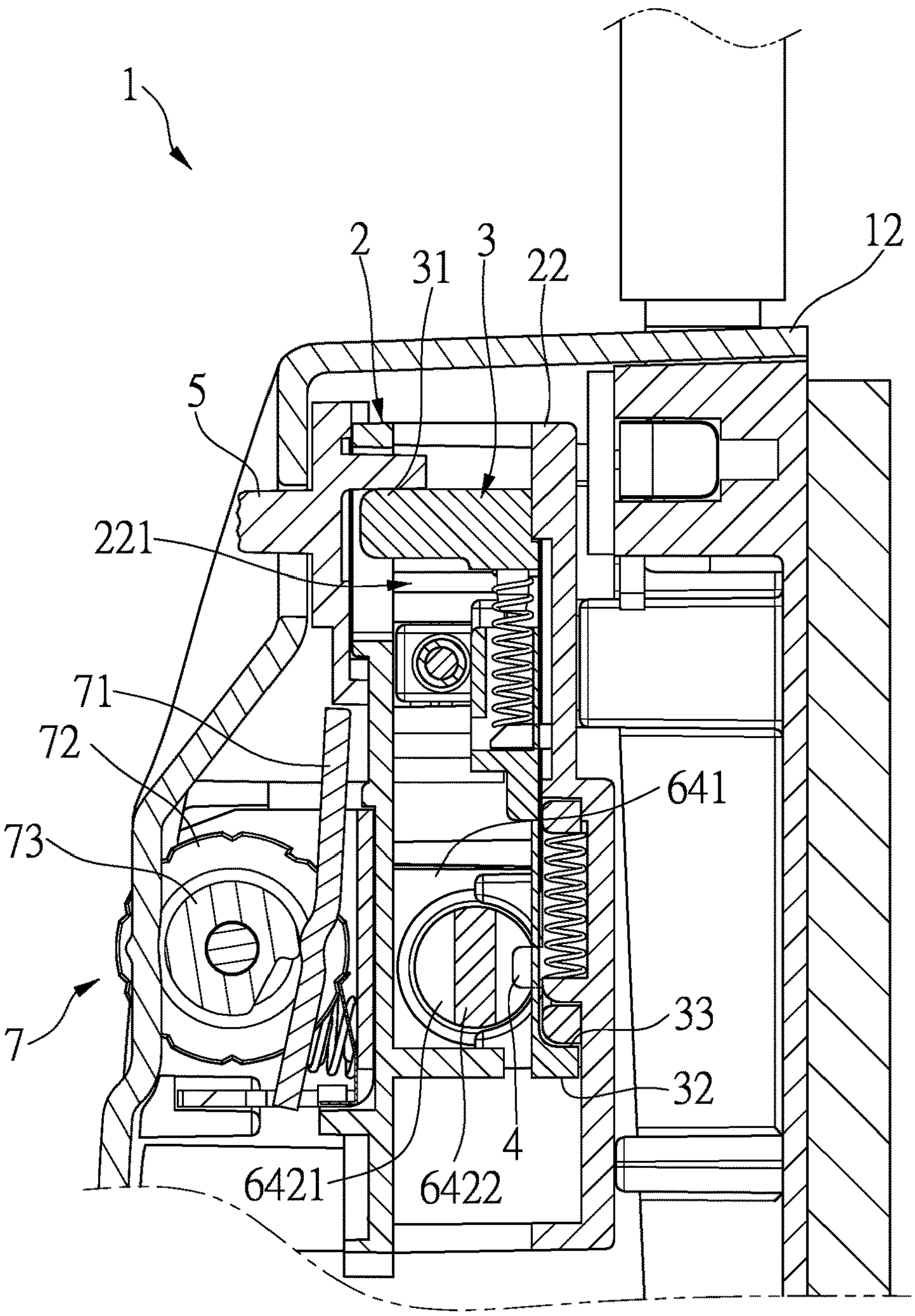
FIG. 9 is a view illustrating that the fingerprint unlocking module does not unlock.
Figure 13:
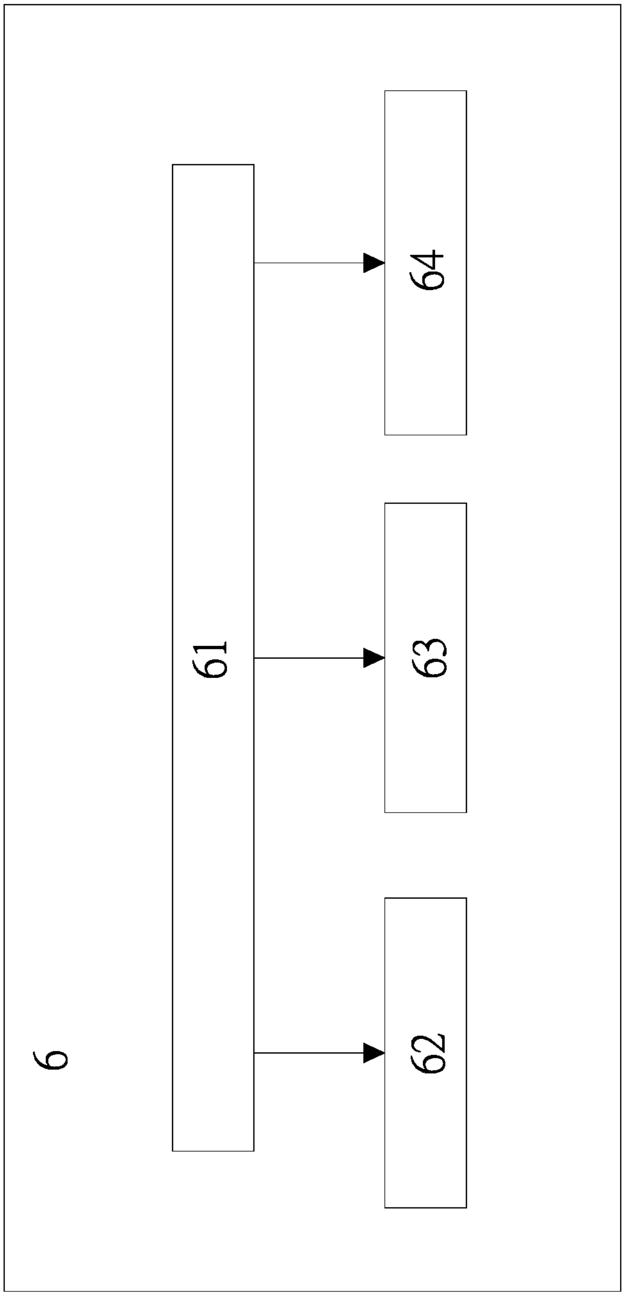
FIG. 13 is a block diagram of the fingerprint unlocking module.

Then the implementation for electric unlocking is introduced, as shown in FIG. 2, FIG. 9, and FIG. 13, wherein the lock cover set 2 further comprises a thumb piece 4. Two opposite ends of the linking member 3 are the manual end 31 and the electric end 32, respectively. The linking member 3 has a protrusion stage 33 at the electric end 32. The thumb piece 4 abuts against the protrusion stage 33. The electric unlocking component 64 comprises a motor 641 and a block 642. The motor 641 is joined to the block 642 by a shaft 643.

The block 642 comprises a shaft coupling portion 6421 and a line-shaped protrusion portion 6422.

The state shown in FIG. 9 is locking state, all elements associated with the fingerprint unlocking module 6 do not limit the shift of the linking member 3.

Figure 10:
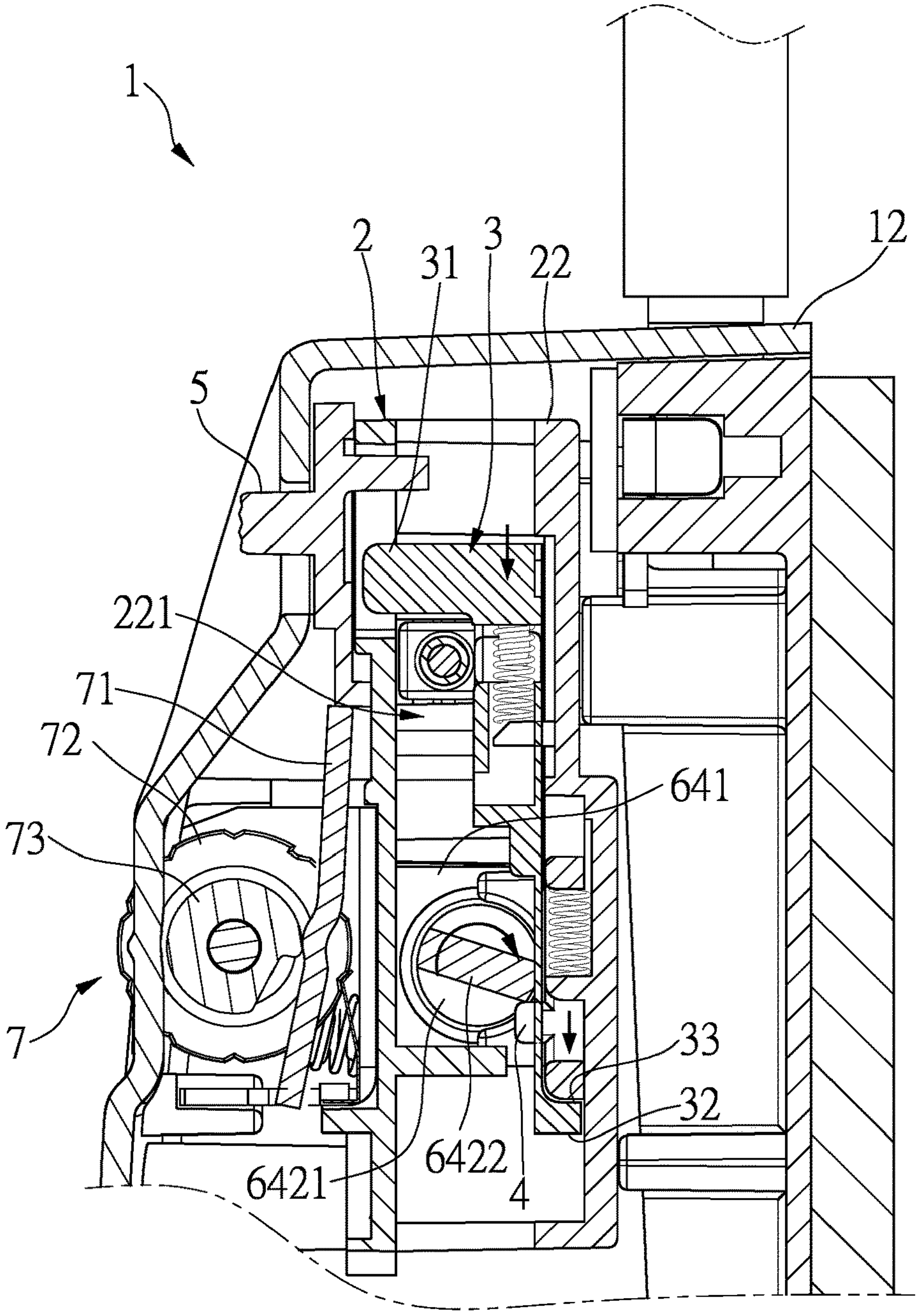
FIG. 10 is a view illustrating that the block poke thumb piece drives the linking member to shift.
Figure 11:
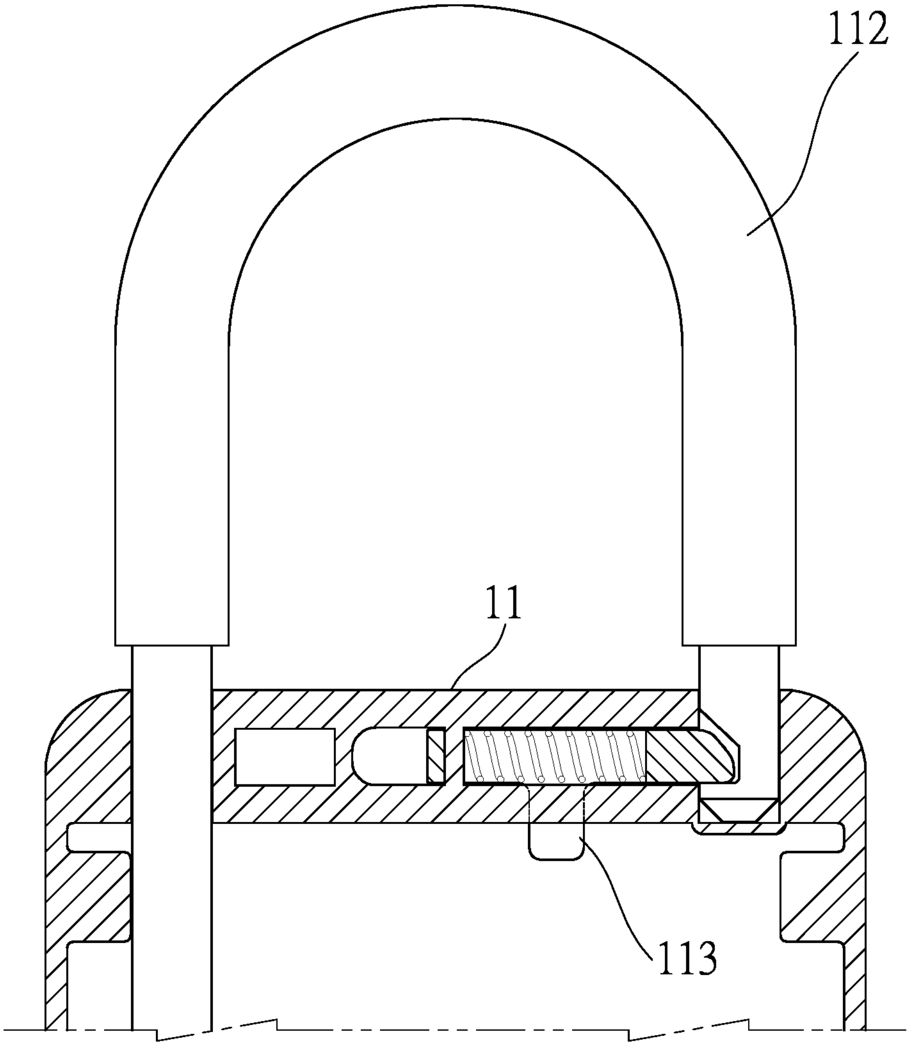
FIG. 11 is a cross-section view along XI-XI line of FIG. 2.
Figure 12:
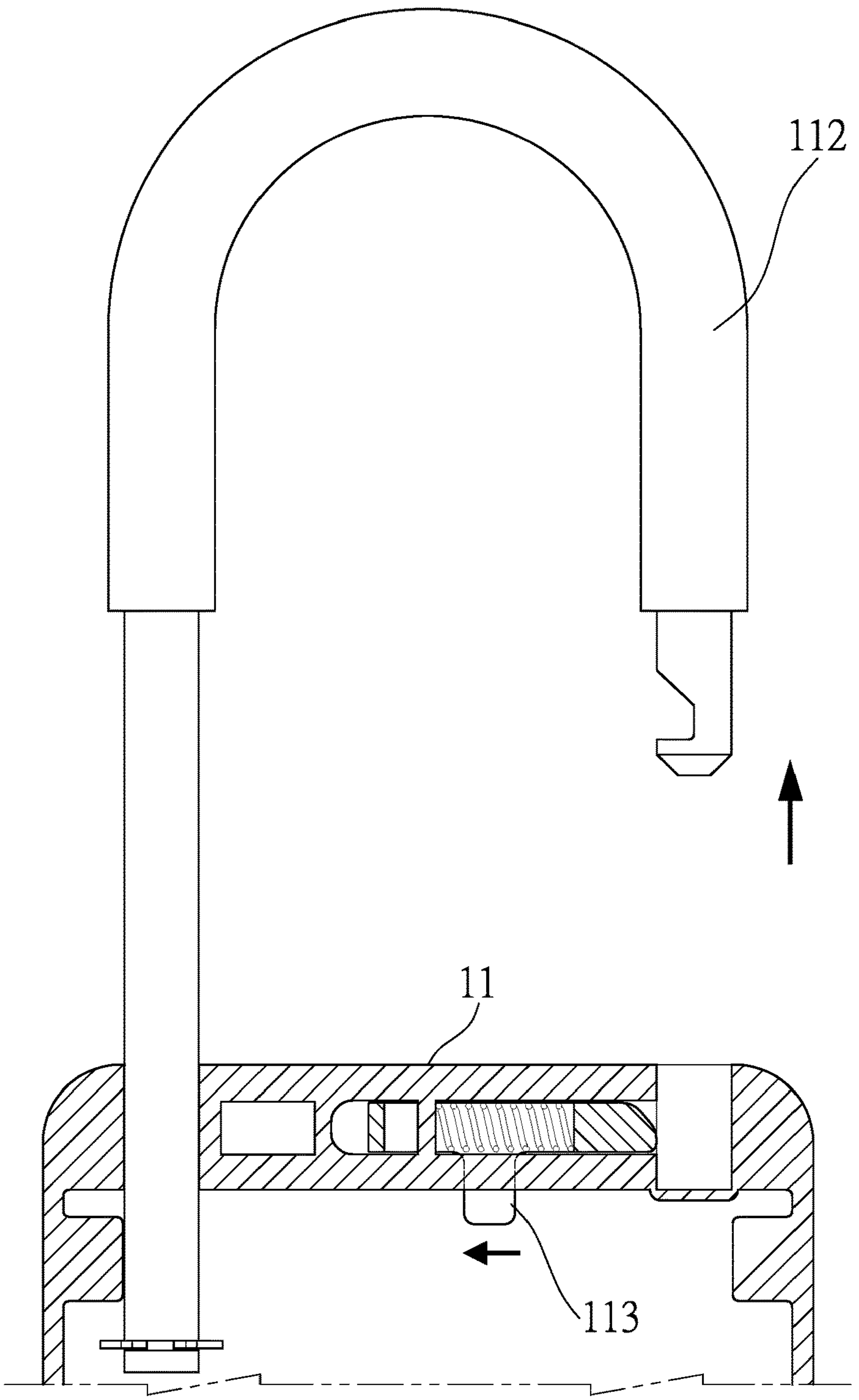
FIG. 12 is a view illustrating that the unlocking deflector rod is operated so that the lock shackle is unlocked.

Even though the fingerprint unlocking module 6 is locked, the manual unlocking form is not affected. When the code sensed by the fingerprint sensor 65 is correct, the master unit 61 will control the motor 641 of the electric unlocking component 64 to rotate. When the motor 641 rotates, the block 642 is driven to rotate by the shaft 643. The thumb piece 4 is poked to shift by the line-shaped protrusion portion 6422 when the block 642 rotates, as shown in FIG. 10. And then, when the thumb piece 4 shifts, the linking member 3 shifts conjointly until shift of the linking member 3 drives the active bolt 21 to separate from the lock groove 111. The manual unlocking component 5 is not connected with the linking member 3 so that shift of the linking member 3 driven by the thumb piece 4 is not affected, even the coded wheel lock set 7 is locked.

In order to summery the content as mentioned above, it is understood that the coded wheel lock set 7 for manual locking and manual unlocking and the fingerprint unlocking module 6 for electric unlocking are configured in the present disclosure respectively, and both of the two said unlocking modes are able to complete the unlocking action independently. It means that even though the power is out or failed in the present disclosure so that unlocking operation is not performed by the fingerprint unlocking module 6, the unlocking operation is completed in a manual operation of the manual unlocking component 5 manner after operating the coded wheel lock set 7 immediately. Indeed, the present disclosure improves the issue that the current electronic lock is not able to be unlocked immediately by normal means in a power failure case, therefore the present disclosure is novelty and non-obviousness.

Furthermore, an implementation associated with how to release the lock shackle 112 after unlocking is introduced by the present disclosure. Wherein the lock box 1 is provided with a lock shackle 112 and an unlocking deflector rod 113, the unlocking deflector rod 113 is partially exposed by the box. After the user unlock the present disclosure, the front cover is opened as shown in FIG. 2. The user may operate the unlocking deflector rod 113 as the manner presented by FIG. 11 and FIG. 12, such that the lock shackle 112 is locked or unlocked.

What is claimed is:

1. A lock device with double-unlocking mode comprising:

a lock box comprising a box and a front cover, the box is mutually pivoted to the front cover, the box has a receiving space, the box has a lock groove;

a lock cover set disposed at the front cover, and the lock cover set comprises an active bolt, when the lock cover set is in a locking state, the active bolt is inserted in the lock groove, when the lock cover set is in an unlocking state, the active bolt is separated from the lock groove, the lock cover set comprising a frame and a linking member, the lock cover set disposed at the front cover by the frame, the frame comprising a sliding space and a sliding rail communicated with each other, the linking member being movable in the sliding space, the active bolt slidably disposed in the sliding space, when the linking member shifts, the active bolt is driven to stretch;

a fingerprint unlocking module disposed at the front cover, and the fingerprint unlocking module comprises a master unit electrically connected with a power, a charging hole, an electric unlocking component, and a fingerprint sensor, and the master unit controls the electric unlocking component to lock, or the master unit controls the electric unlocking component to unlock in accordance with sensing results of the fingerprint sensor; and a coded wheel lock set disposed at the front cover, when a code of the coded wheel lock set is set correctly, the lock cover set is able to be manually operated to unlock.

2. The lock device with double-unlocking mode according to claim 1, wherein the linking member has a guiding groove which has a guiding incline wall surface, the active bolt comprises a guide projection which is inserted into the guiding groove, and the guide projection abuts against the guiding incline wall surface.

3. The lock device with double-unlocking mode according to claim 1, wherein the lock cover set further comprises a manual unlocking component, the linking member has a manual end, the manual unlocking component abuts against the manual end of the linking member, the manual unlocking component is partially corresponding to the coded wheel lock set, when the coded wheel lock set is unlocked, the manual unlocking component is able to be manually operated to unlock, such that the linking member shift drives the active bolt to be separated from the lock groove.

4. The lock device with double-unlocking mode according to claim 1, wherein the lock cover set further comprises a thumb piece, the linking member has an electric end, the linking member has a protrusion stage at the electric end, the thumb piece abuts against the protrusion stage, the electric unlocking component comprises a motor and a block, the motor is joined to the block by a shaft of the motor, when the code sensed by the fingerprint sensor is correct, by means of the shaft, the motor drives the block to rotate for poking the thumb piece to shift, when the thumb piece shifts, the linking member shifts conjointly until shifting of the linking member drives the active bolt to separate from the lock groove.

5. The lock device with double-unlocking mode according to claim 4, wherein the block comprises a shaft coupling portion coupled to itself and a line-shaped protrusion portion, the block is coupled to the shaft by the shaft coupling portion.

6. The lock device with double-unlocking mode according to claim 1, wherein the lock box is provided with a lock shackle and an unlocking deflector rod, the unlocking deflector rod is partially exposed by the box, the unlocking deflector rod is operated such that the lock shackle is locked or unlocked.

7. The lock device with double-unlocking mode according to claim 1, wherein the lock cover set further comprises a manual unlocking component, wherein the lock cover set further comprises a thumb piece, two opposite ends of the linking member are a manual end and an electric end respectively, the manual unlocking component abuts against the manual end of the linking member, the manual unlocking component is partially corresponding to the coded wheel lock set, when the coded wheel lock set is unlocked, the manual unlocking component is able to be manually operated to unlock, such that shift of the linking member drives the active bolt to be separated from the lock groove, the linking member has a protrusion stage at an electric end, the thumb piece abuts against the protrusion stage, the electric unlocking component comprises a motor and a block, the motor is joined to the block by a shaft, when the code sensed by the fingerprint sensor is correct, by means of the shaft, the motor drives the block to rotate for poking the thumb piece to shift, when the thumb piece shifts, the linking member shifts conjointly until shift of the linking member drives the active bolt to separate from the lock groove.

* * * * *